(No Model.)
W. E. SHARPLES.
BELTING.
No. 488,617. Patented Dec. 27, 1892.
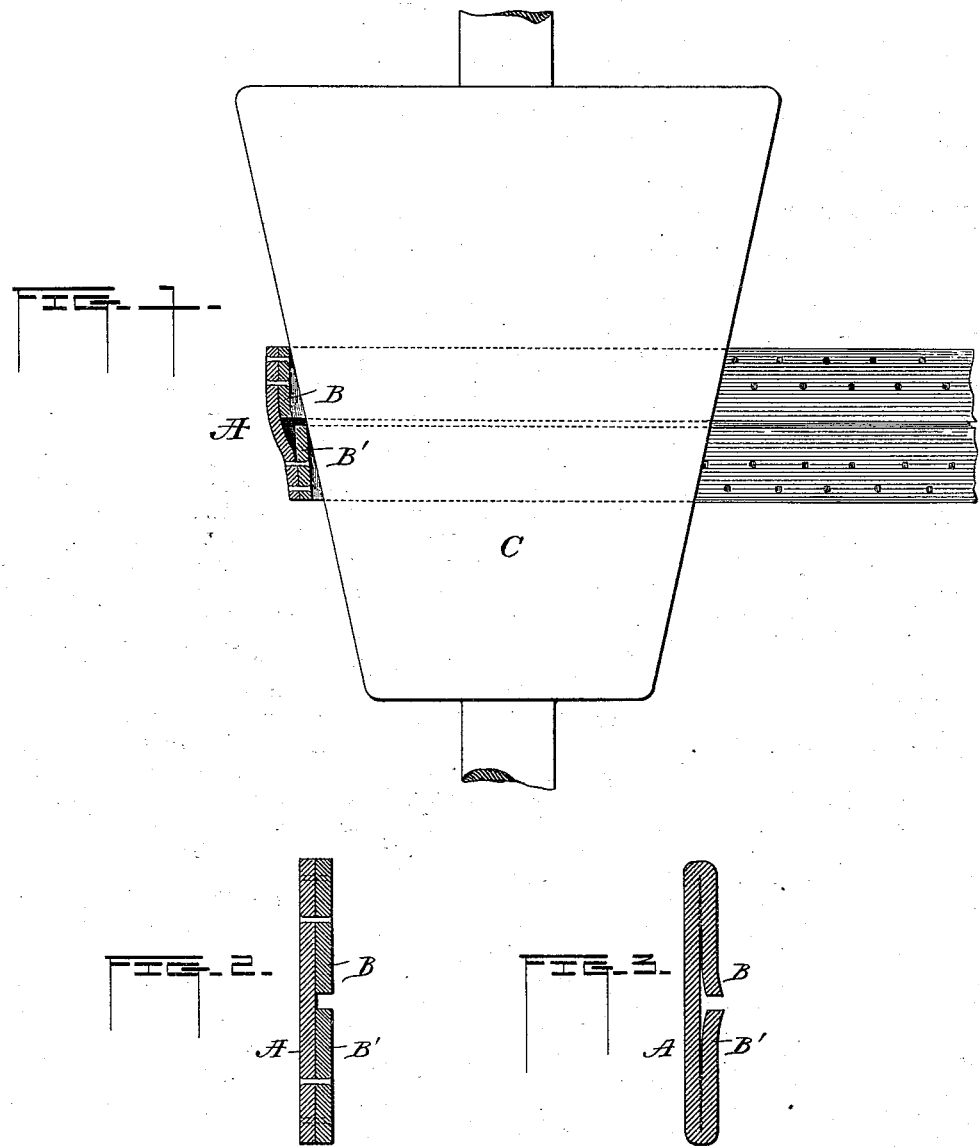

UNITED STATES PATENT OFFICE.

WILLIAM E. SHARPLES, OF FALL RIVER, MASSACHUSETTS.

BELTING.

SPECIFICATION forming part of Letters Patent No. 488,617, dated December 27, 1892.

Application filed February 19, 1892. Serial No. 422,099. (No model.)

*To all whom it may concern:*

Be it known that I, WILLIAM E. SHARPLES, a citizen of the United States, residing at Fall River, in the county of Bristol and State of Massachusetts, have invented certain new and useful Improvements in Belts for Conical Pulleys; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to belting for conveying motion and power, and especially to belts intended for conical pulleys, such as are used in spinning or other machinery.

When an ordinary belt is placed on a pair of conical pulleys, it comes in contact with them at one edge instead of across the entire face of the belt: owing to the fact that the face of the belt is perpendicular to the plane in which the belt travels, while the surfaces of the pulleys are oblique to said plane. This produces an uneven tension on the belt, and renders it difficult to make it work properly.

My invention aims to remedy the defect by making the belt with its working face divided into two or more parallel sections united at one edge only to a suitable backing.

In the drawings, Figure 1 shows a conical pulley and a belt made in accordance with my invention. Figs. 2 and 3 are cross sections of belts on enlarged scales.

My improved double belt is composed of a suitable outer portion or backing A, of leather, rubber, canvas or the like, having upon its inner or working face, two or more narrow sections B B', which are united to the backing A along one edge only. These sections constitute practically separate narrow belts, placed side by side and attached to a common backing. They may be secured to the backing in any suitable manner, as by riveting, pegging, lacing, sewing, or cementing; or if desired, they may be integral with the backing, being formed by folding the edges of a a wide belt upon itself as shown in Fig. 3. The flaps thus formed may be cemented for a portion of their width. It is essential, however, not only in this modification but in all instances, to leave one edge of each section free, preferably to about the middle of the section. It is also preferred when two sections are used to have the free edges adjacent, as shown. When a belt thus made is placed over a pair of conical pulleys C, it assumes the form shown in Fig. 1, and as soon as a tension is brought upon it, the sections tend to hug the pulley closely, the backing yielding sufficiently to allow this effect. The result is that the belt works with less wear and transmits more power than one made in the old way.

Having thus described my invention, what I claim and desire to secure by Letters Patent is:

1. A belt for conical pulleys comprising a flexible backing having two or more flat narrow sections united thereto at or near one of their edges, with their other edges left free, substantially as set forth.

2. A double belt for conical pulleys, consisting of the flexible backing A, having the sections B B' united thereto at or near one of their edges only, with their free edges adjacent to each other, substantially as set forth.

In testimony whereof I affix my signature in presence of two witnesses.

WILLIAM E. SHARPLES.

Witnesses:
ARBA N. LINCOLN
CHARLES L. FOOTE.